US012414018B2

(12) United States Patent
Yamine et al.

(10) Patent No.: US 12,414,018 B2
(45) Date of Patent: Sep. 9, 2025

(54) BASE STATION, FIRST USER EQUIPMENT, SECOND USER EQUIPMENT AND METHODS IN A WIRELESS COMMUNICATIONS NETWORK

(71) Applicant: Telefonaktiebolaget LM Ericsson (publ), Stockholm (SE)

(72) Inventors: Badawi Yamine, Beirut (LB); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 392 days.

(21) Appl. No.: 17/922,643

(22) PCT Filed: May 20, 2020

(86) PCT No.: PCT/SE2020/050520
§ 371 (c)(1),
(2) Date: Nov. 1, 2022

(87) PCT Pub. No.: WO2021/235986
PCT Pub. Date: Nov. 25, 2021

(65) Prior Publication Data
US 2023/0115591 A1 Apr. 13, 2023

(51) Int. Cl.
H04W 36/00 (2009.01)
H04W 36/32 (2009.01)
H04W 36/30 (2009.01)

(52) U.S. Cl.
CPC . H04W 36/0058 (2018.08); H04W 36/00837 (2018.08); H04W 36/322 (2023.05); H04W 36/30 (2013.01)

(58) Field of Classification Search
CPC . H04L 65/80; H04L 43/0876; H04L 41/0823; H04W 84/18; H04W 36/302;
(Continued)

(56) References Cited

U.S. PATENT DOCUMENTS 8,219,096 B2   7/2012  Wu et al.
2011/0306346 A1*  12/2011  Yoon ............... H04W 36/304
                                                        455/437
(Continued)

FOREIGN PATENT DOCUMENTS

GB    2566987 A    9/2017
WO  2009076892 A1  6/2009
(Continued)

OTHER PUBLICATIONS

EPO Communication dated Jun. 6, 2023 for Patent Application No. 20936477.7, consisting of 11-pages.
(Continued)

*Primary Examiner* — Quoc Thai N Vu
(74) *Attorney, Agent, or Firm* — Weisberg I.P. Law, P.A.

(57) ABSTRACT

A method performed by abase station for handling network degradation in a wireless communications network is provided. The base station receives (201, IS1) from a first UE experiencing a network degradation, a determined type of the network degradation together with an estimated first Timing Advance, TA1, value. Based on the received TA1 value, the base station calculates (202, 1) a location, location X, associated with the network degradation. When a first location, location L1, of a second UE is at a distance from the location X that is below a second threshold, the base station decides (204, 2) a first decision to perform an action to restrain degrading influence from the location X. The first decision is based on the determined type of the network degradation. The base station sends (205, 2) to the second UE, the first decision to perform an action to restrain degrading influence from the location X.

18 Claims, 15 Drawing Sheets

(58) Field of Classification Search
CPC ........... H04W 36/305; H04W 28/0289; H04W 28/0284; H04W 28/0958; H04W 72/52; H04W 56/006; H04W 56/0065; H04W 72/54; H04W 24/02
See application file for complete search history.

(56) References Cited

U.S. PATENT DOCUMENTS

| | | | |
|---|---|---|---|
| 2016/0162783 A1* | 6/2016 | Tan ........................ | H04W 24/02 706/13 |
| 2016/0165472 A1* | 6/2016 | Gopalakrishnan .... | H04W 24/10 455/67.11 |
| 2018/0098258 A1 | 4/2018 | Annam et al. | |
| 2019/0246292 A1* | 8/2019 | Shekalim .............. | H04W 24/10 |

FOREIGN PATENT DOCUMENTS

| | | |
|---|---|---|
| WO | 2010058374 A1 | 5/2010 |
| WO | 2018103855 A1 | 6/2018 |
| WO | 2018184789 A1 | 10/2018 |
| WO | 2018205428 A1 | 11/2018 |
| WO | 2019133049 A1 | 7/2019 |

OTHER PUBLICATIONS

EPO Communication with Supplementary European Search Report dated May 25, 2023 for Patent Application No. 20936477.7, consisting of 4-pages.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.4.0, Dec. 1, 2018, pp. 1-933, 3GPP.

Kangas, A. et al., "Position in LTE", Handbook of Position Location—Theory, Practice and Advances, Jul. 12, 2017, pp. 1-65, Ericsson.

* cited by examiner

```
┌─────────────────────────────────────────────────────────────────────┐
│ 301. Determine type of network degradation.                         │
└─────────────────────────────────────────────────────────────────────┘
                                    │
                                    ▼
┌─────────────────────────────────────────────────────────────────────┐
│ 302. Send to base station, determined type of network degradation and estimated │
│ first TA1 value.                                                    │
└─────────────────────────────────────────────────────────────────────┘
```

Fig. 3

Method 1

10. Whether UE2 is moving inside cell1 (scenario 1) or it is moving from celln towards cell1 (scenario 2), cell1 may ask UE2 to report radio measurements on all its neighbors.

↓

11. Based on received:
- radio measurement reports,
- the type of degradation,
- the type of ongoing communication, Cell1 (scenario 1) or celln (scenario 2) might take actions on UE1, e.g. force handover towards a neighbor, e.g. cell2, until UE1 leaves the degraded area.

↓

12. When UE2 leaves the area of degradation, cell2 might hand over UE2 respectively to cell1 and celln.

Fig. 5b

Method 2

20. UE1 takes precaution action, e.g. suspend sending any data until it passes the degraded area when one of following two events occur:
1st event: UE1 is close to target TA1 and start experiencing the degradation.
2nd event: As UE1 could not calculate its geographical location on its own, the network indicates to the UE that it is approaching Location X in order to take an action.

Fig. 5c

BASE STATION, FIRST USER EQUIPMENT, SECOND USER EQUIPMENT AND METHODS IN A WIRELESS COMMUNICATIONS NETWORK

TECHNICAL FIELD

Embodiments herein relate to a base station, a first User Equipment (UE), a second UE, and methods therein. In some aspects, they relate to handling network degradation in a wireless communications network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Positioning Latency in LTE and Other Cellular Systems

Positioning in LTE is e.g. described in "Positioning in LTE, Handbook of Position Location, Theory Practice and Advances, chapter 32, Hoboken: NJ, IEEE Press & Wiley, 2012", by authors A. Kangas, I. Siomina and T. Wigren.

In particular it describes a positioning architecture, positioning methods and their performance. The following positioning methods are available in the LTE cellular system:
   Cell Identity (CID)—Determines the UE position with
      cell granularity.
   Enhanced Cell Identity (E-CID)—Cell identity is combined with auxiliary radio measurements such as:
      Timing Advance (TA)
      UE Rx-Tx—UE frame latency
      Angle of Arrival (AoA)
      Radio signal strength related measurements
      Radio Frequency (RF) fingerprinting
   Adaptive Enhanced Cell Identity (AECID)
   Observed Time Difference of Arrival (OTDOA)
   Uplink Time Difference of Arrival (U-TDOA)
   A-GNSS—Satellite based positioning including A-GPS,
      Galileo and GLONASS The above publication also discusses the positioning times of the listed positioning methods (protocol delays are not taken into account and would needed to be also added). The following rough figures may be given as an indication of the e positioning times of the listed positioning methods:
   CID—much less than a second
   E-CID—much less than a second to 2-3 seconds
   RF-fingerprinting—1-10 seconds depending on filtering
   AECID—less than a second to 2-3 seconds
   OTDOA—3-20 s
   U-TDOA—3-20 s
   A-GNSS—5-30 s Positioning times are similar in other cellular systems. The times can be much longer for low complexity UEs such as Machine Type Communication (MTC) or Narrowband (NB)-Internet of Things (IoT) UEs. The most commonly used method for a low complexity UE to report its location comprises reporting a cell identity of cell where it is located.

When an accurate positioning capable UE located in a cell experiences a network degradation, e.g. a radio type of degradation, at a specific location, it will report, preferably in real time, that location to the network, e.g. via dedicated signaling. When the UE detects the degradation, the UE may be in idle or in connected mode. The reason for reporting the network degradation is that on one hand the network takes an action to solve the issue and on the other hand any other UE moving into the area of degradation may be able to avoid such degradation which might be useful depending on the type of UE passing by that area, e.g. a driverless car, and of type of degradation, e.g. radio or others.

As a consequence, one immediate reaction from the network is to broadcast the location of the network degradation to all UEs in the cell so that the UEs may take a precaution action while being close to the area of degradation.

In some cases, the network is not capable to broadcast the location of the area of degradation to all UEs in the cell. In these cases, there is no other way for the UEs to learn about the degraded area but to experience the degradation and losing in performance. This may lead to an increased number of lost connections, decreased data rates and lost data packages.

SUMMARY

An object of embodiments herein is to improve the performance of a wireless communications network.

According to an aspect of embodiments herein, the object is achieved by a method performed by a base station for handling network degradation in a wireless communications network. The base station receives from a first UE experiencing a network degradation, a determined type of the network degradation together with an estimated first Timing Advance, TA1, value. Based on the received TA1 value, the base station calculates a location, location X, associated with the network degradation. When a first location, location L1, of a second UE is at a distance from the location X that is below a second threshold, the base station decides a first decision to perform an action to restrain degrading influence from the location X. The first decision is based on the determined type of the network degradation. The base station sends to the second UE, the first decision to perform an action to restrain degrading influence from the location X.

According to another aspect of embodiments herein, the object is achieved by a method performed by a first User Equipment, UE, for assisting a base station in handling network degradation in a wireless communications network. When experiencing a network degradation the first UE send to the base station a determined type of the network degradation together with an estimated first Timing Advance, TA1, value. The TA1 value will enable the base station to identify one or more second UEs that are close to a degraded location, location X, associated with the network degradation. The determined type of network degradation will enable the base station to make a first decision to perform an action to restrain degrading influence from the location X. The action is to be performed by the identified second UEs.

According to another aspect of embodiments herein, the object is achieved by a method performed by a second User Equipment, UE, for handling network degradation in a wireless communications network. When a first location, location L1, of the second UE is at a distance from a degraded location, location X, associated with the network degradation, that is below a second threshold, the second UE receives a first decision from a base station. The first decision is to perform an action to restrain degrading influence from the location X. The first decision is based on a determined type of the network degradation.

According to another aspect of embodiments herein, the object is achieved by a base station configured to handle network degradation in a wireless communications network. The base station is further configured to:
  to receive from a first UE experiencing a network degradation, a determined type of the network degradation together with an estimated first Timing Advance, TA1, value,
  based on the received TA1 value, calculate a location, location X, associated with the network degradation,
  when a first location, location L1, of a second UE is at a distance from the location X that is below a second threshold, decide a first decision to perform an action adapted to restrain degrading influence from the location X, which first decision is adapted to be based on the determined type of the network degradation, and
  send to the second UE, the first decision to perform an action adapted to restrain degrading influence from the location X.

According to another aspect of embodiments herein, the object is achieved by a first User Equipment, UE, configured to assist a base station in handling network degradation in a wireless communications network. The first UE is further configured to, when experiencing a network degradation, send to the base station, a determined type of the network degradation together with an estimated first Timing Advance, TA1, value. The TA1 value is adapted to enable the base station to identify one or more second UEs that are close to a degraded location, location X, associated with the network degradation. The determined type of network degradation is adapted to enable the base station to make a first decision to perform an action to restrain degrading influence from the location X. The action is to be performed by the identified second UEs.

According to another aspect of embodiments herein, the object is achieved by a second User Equipment, UE. The second UE is configured to handle network degradation in a wireless communications network. The second UE is further configured to, when a first location, location L1, of the second UE is at a distance from a degraded location, location X, associated with the network degradation, that is below a second threshold, receive a first decision from a base station. The first decision is to perform an action to restrain degrading influence from the location X. The first decision is adapted to be based on a determined type of the network degradation.

Thanks to that the base station receives a type of network degradation and a timing advance value from the first UE experiencing the network degradation, it is possible for the base station to calculate the location of the network degradation. The base station can then decide to perform an action restraining the influence of the network degradation on a second UE when the second UE is close to, i.e. located at a distance from the network degradation that is below a threshold and send the decision to the to the second UE to perform the action to restrain the influence of the network degradation. In this way, an efficient mechanism improving the handling of network degradation is achieved.

Embodiments herein bring the advantage of an efficient mechanism improving the handling of network degradation. This is achieved by making it possible to determine a more accurate location of the network degradation, which leads to a more efficient method for restraining the influence of the network degradation for UEs moving towards the degradation. This results in an improved performance of the wireless communications network.

BRIEF DESCRIPTION OF THE DRAWINGS

Examples of embodiments herein are described in more detail with reference to attached drawings in which:

FIG. 3 is a flowchart depicting embodiments of a method in a first UE.

DETAILED DESCRIPTION

As part of developing embodiments herein a problem was identified by the inventors and will first be discussed.

A disadvantage is that a UE experiencing a network degradation, may not be able to accurately report its location to the network. This means that the network may not be able to take precautionary actions to restrain the influence of the network degradation on UEs moving towards the degradation. This means more UEs will experience the network degradation which may lead to an increased rate of loss of connections, dropped data rates and lost data packages. This in turn means more signaling and retransmissions of data packages resulting in a decreased performance in wireless communications network.

Figure 1A:
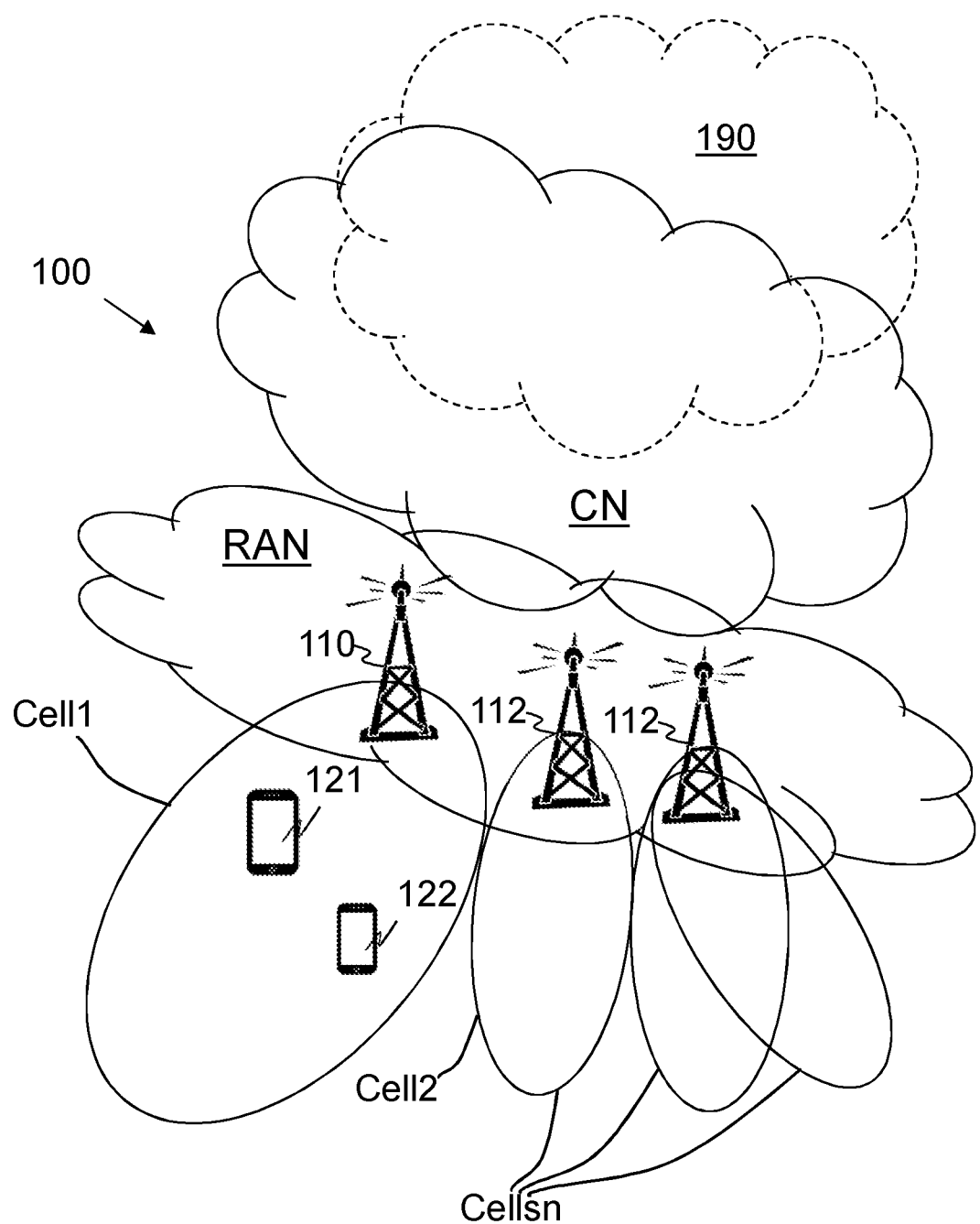
FIG. 1a is a schematic block diagram illustrating embodiments of a wireless communications network.

FIG. 1*a* is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Wireless devices such as e.g. a first UE 121 and a second UE 122 operate in the wireless communications network 100. The respective first UE 121 and second UE 122 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. a network node 110, one or more Access Networks (AN), e.g. a RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a car or any small base station communicating within a first cell (cell1) provided by a base station 110.

Base stations such as the base station 110 and a number of second base stations 112, operate in the wireless communications network 100. The base station 110 provides a first cell, referred to as cell1 and possibly a neighbour second cell, referred to as cell2. The second base stations 112 provides a number of neighbour cells, referred to as cellsn, and may as an alternative be the base station providing the neighbour cell2. The base station 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with UEs such as the first UE 121 and the second UE 122, within a first cell, cell1, served by the base station 110 depending e.g. on the radio access technology and terminology used. The base station 110 may be referred to as a serving radio network node and communicates with the first UE 121 and the second UE 122 with Downlink (DL) transmissions to the first UE 121 and the second UE 122 and Uplink (UL) transmissions from the first UE 121 and the second UE 122. The second cell, cell2, among neighbour cells, cellsn, to the cell1, is served by a second base station, not shown in FIG. 1*a*, capable of communicating with UEs such as the first UE 121 and the second UE 122.

Methods according to embodiments herein are performed by the base station 110, the first UE 121 and the second UE 122. These nodes may be Distributed Nodes and functionality, e.g. comprised in a cloud 190 as shown in FIG. 1*a* may be used for performing or partly performing the methods.

Figure 1B:
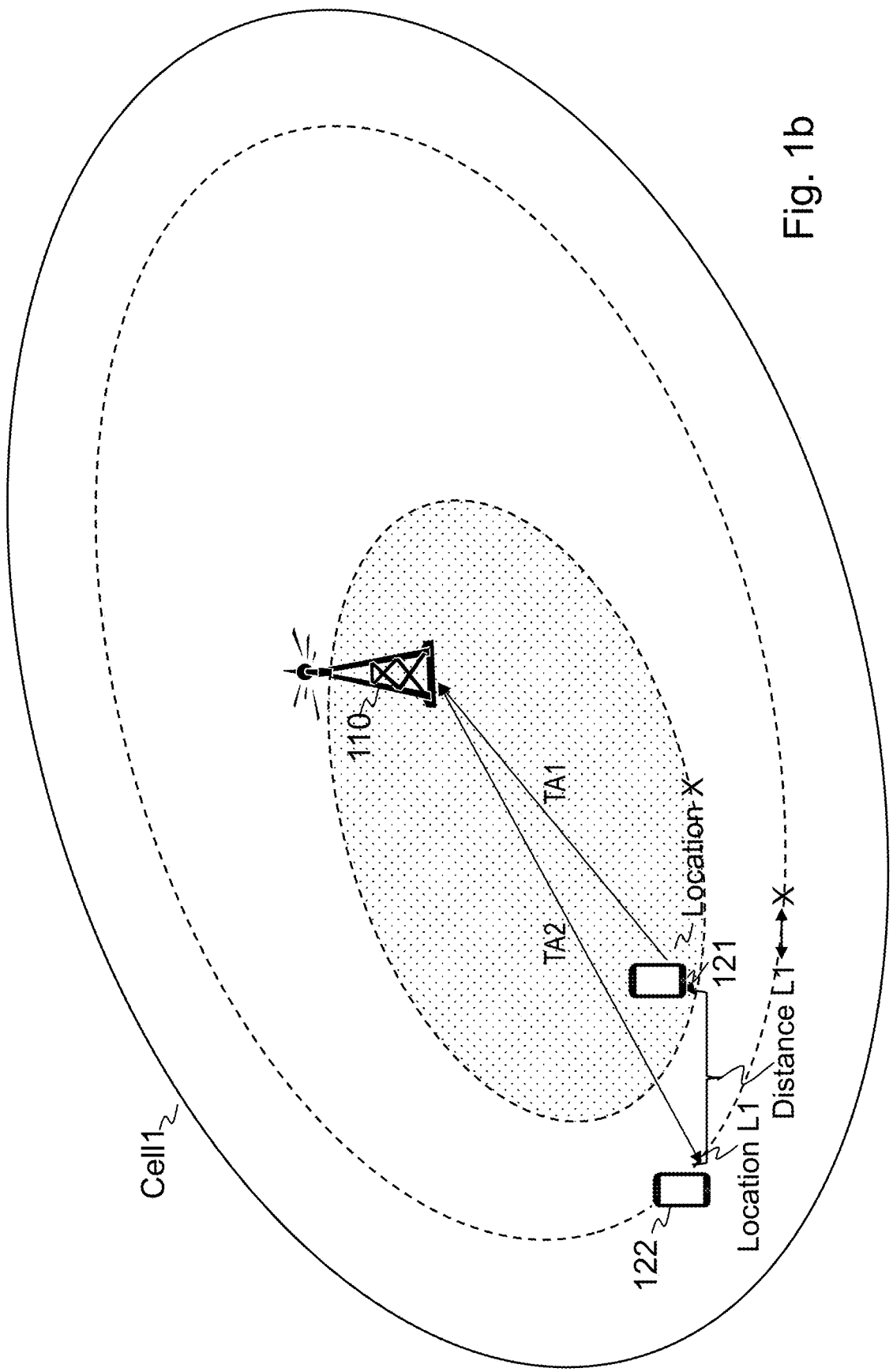
FIG. 1b is a schematic block diagram illustrating embodiments of a wireless communications network.

FIG. 1*b* shows a part of the wireless communications network 100 according to an example scenario wherein embodiments herein may be applied. The first cell (cell1) comprises a network degradation area, marked with dots in FIG. 1*b*. Cell1 is served by the base station 110. The first UE 121 and the second UE 122, are located within cell1. The first UE 121 is located at location X. At location X, the first UE 121 experiences the network degradation. At location X, the first UE 121 is at a distance TA1 from the base station 110, where TA1 is a first timing advance value estimated by the first UE 121 when being located at location X.

The second UE 122 is located at location L1. At location L1, the second UE 122 does not yet experience the network degradation. At location L1, the second UE 122 is at a distance TA2 from the base station 110, where TA2 is a second timing advance value estimated by the second UE 122 when being located at location L1.

According to embodiments herein the second UE 122 will be instructed to perform an action to restrain degrading influence from network degradation area before moving into the network degradation area.

Figure 2:
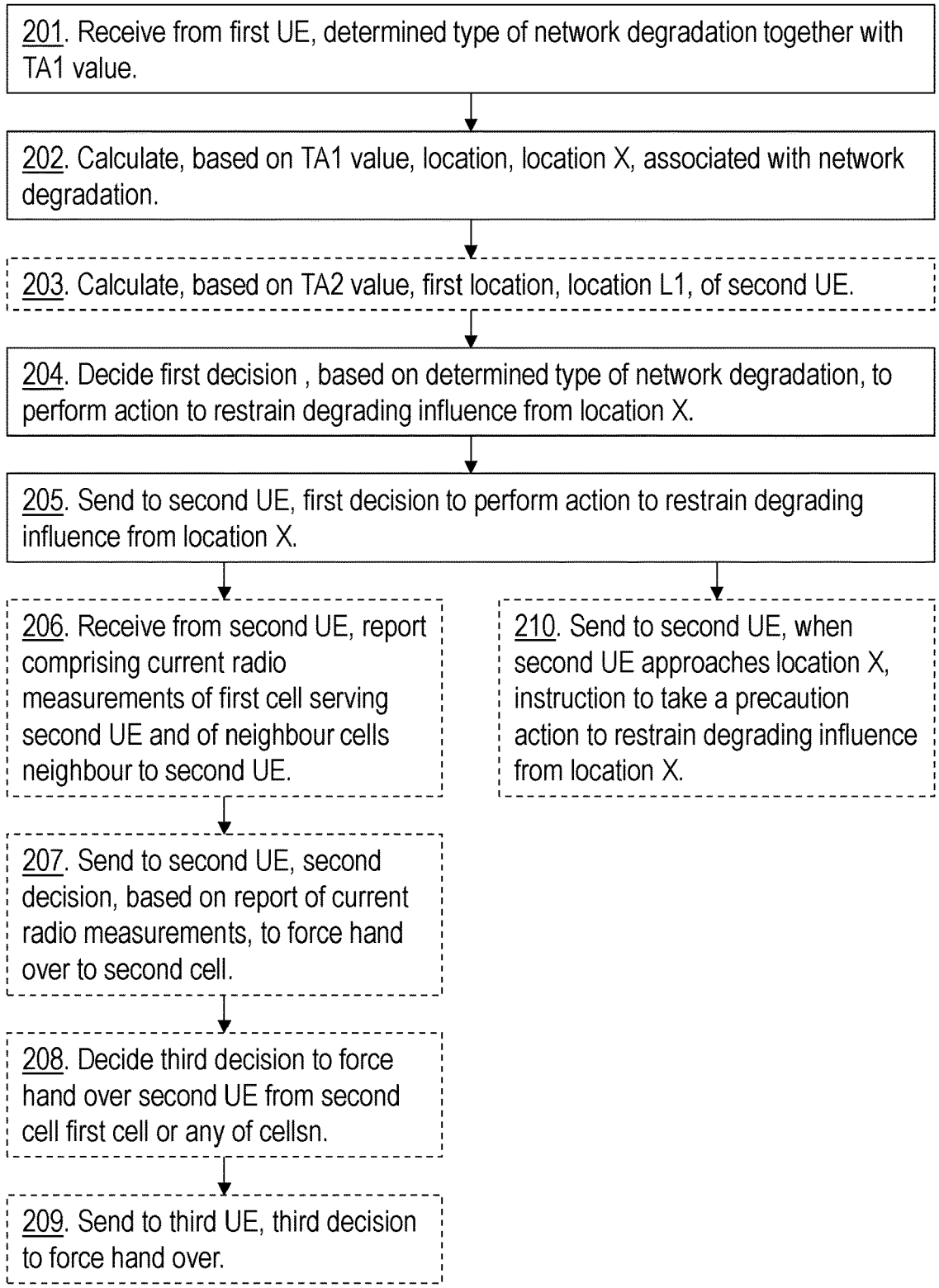
FIG. 2 is a flowchart depicting embodiments of a method in a base station.
Figure 4:
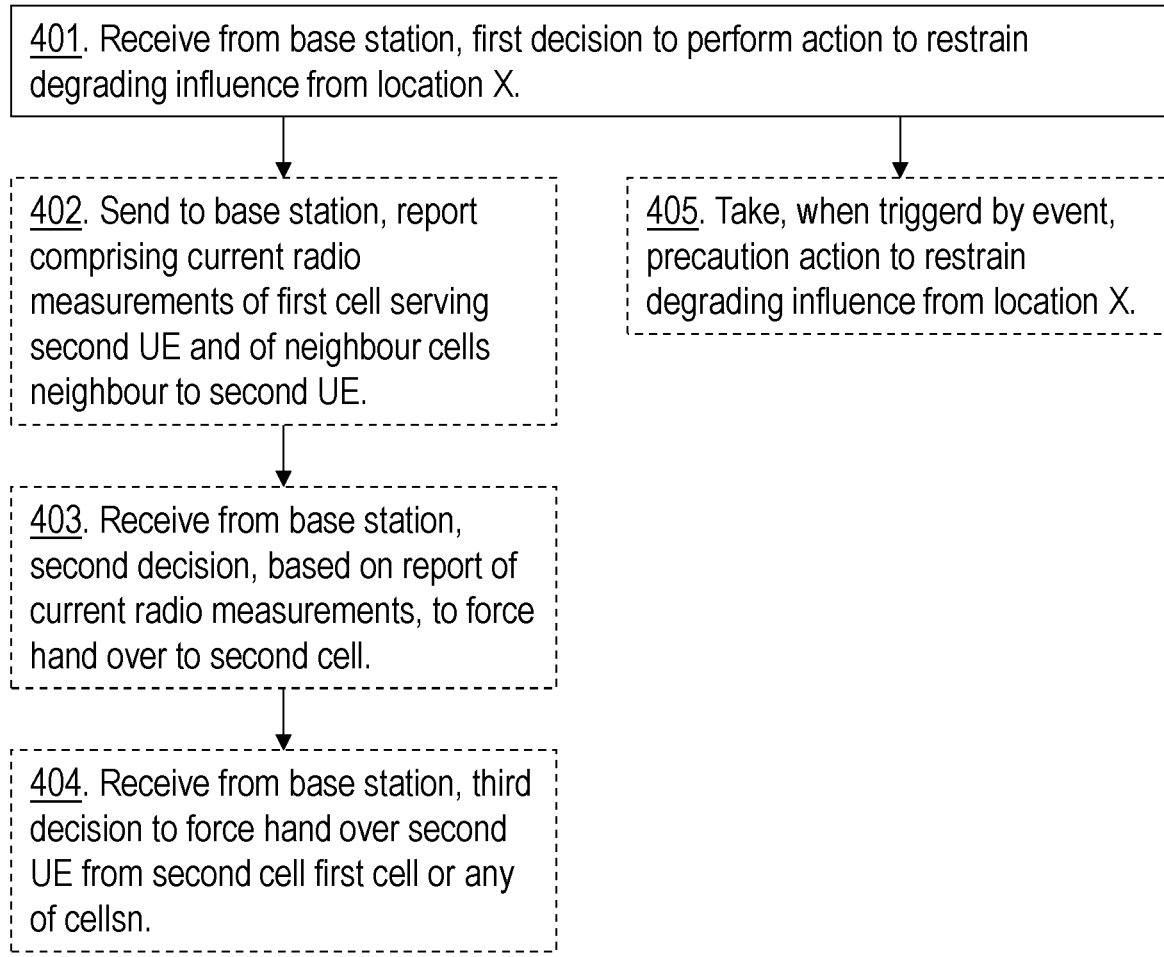
FIG. 4 is a flowchart depicting embodiments of a method in a second UE.

The method according to embodiments will now be described, first from the view of the base station 110 together with FIG. 2, then from the view of the first UE 121 together with FIG. 3 and the second UE 122 together with FIG. 4.

Example embodiments of a method performed by the base station 110, for handling a network degradation in a in the wireless communications network 100, will now be described with reference to a flowchart depicted in FIG. 2. In an example scenario a first UE 121 experiences a network degradation as can be seen from FIG. 1*b* described above. The network degradation may result in an increased rate of loss of connections, dropped data rates and lost data packages if no precautionary actions is taken. The first UE 121 is served by the base station 110. The method comprises the following actions, which actions may be taken in any suitable order. Actions that are optional are presented in dashed boxes in FIG. 2.

Action 201

In order to restrain the influence from a network degradation, the type and location of the degradation needs to be known by the wireless communications network 100.

The base station 110 receives a determined type of the network degradation together with an estimated first Timing Advance value TA1 from the first UE 121 experiencing the network degradation. A TA value informs the base station 110 about a distance between a UE such as e.g. the first UE 121 and the base station 110.

Depending on the type of network degradation different actions to restrain the influence of the network degradation may be decided later on.

The determined type of the network degradation may e.g. be any one out of a radio degradation in DL only, a radio degradation in both DL and UL, interference in UL, a measurement exceeding a threshold that was normal recently or delta time ago, a non-radio degradation comprising any one out of a fire, an explosion, a car crash, a virus, or a gas.

This relates to Action Initial State (IS)1 (IS1) that will be described below.

Action 202

To enable the base station 110 to handle the network degradation, the location of the degradation needs to be calculated.

Based on the received TA1 value, the base station 110 calculates a location, location X, associated with the network degradation. This allows the base station 110 to monitor and identify UEs such as e.g. a second UE 122, approaching the network degradation, e.g. to warn them.

In some embodiments the base station 110 broadcasts the TA1 value to all UEs located in cell1 to indicate that there is a network degradation at TA1.

This relates to Action 1 that will be described below.

Action 203

In some of these embodiments the second UE 122 comprises one or more second UEs 122.

In order to determine if a second UE 122 is approaching the network degradation, the base station 110 may need to know the location of that second UE 122 to compare it with the location of the network degradation.

Therefore, in some embodiments, when a second UE 122 out of the one or more second UEs 122 has a second TA, TA2, value with a difference to the TA1 value that is below a first threshold value, the base station 110 calculates a first location L1 of that second UE 122 based on its TA2 value.

This relates to Action 1 that will be described below.

Action 204

The base station 110 compares the location of the second UE 122 with the location of the network degradation to determine if the second UE 122 is close enough, to the degraded area to decide to act for the second UE 122 such that it takes a precaution action to restrain degrading influence from the degraded area. I.e. is at a distance from the location X that is below a second threshold.

So, when the first location, location L1, of a second UE 122 is at a distance from the location X that is below a second threshold, the base station 110 decides a first decision to perform an action. The action is to restrain degrading influence from the location X. The first decision is based on the determined type of the network degradation.

In some embodiments, the base station 110 decides a first decision to perform an action to restrain degrading influence from the location X, is performed for each second UE (122) with a location L1 that is at a distance from the location X that is below the second threshold.

As mentioned above, the base station 110 decides a first decision to perform an action in order to restrain the influence of the network degradation.

In some of these embodiments the action to be performed to restrain degrading influence from the location X, comprises any one out of a first method controlled by any one out of the base station 110, or a neighbour base station, and a second method controlled by the second UE 122.

In some embodiments the first method has priority over the second method. Whether the action to be performed comprises the first method or the second method, may e.g. depend on any one or more out of the signal quality the second UE 122 receives from one or more cells, cellsn, being neighbour to the second UE 122, the level of congestion of the one or more cells, or the one or more cells may suffer from one or more types of degradation. The signal quality may depend on e.g. Reference Signal Received Power (RSRP), Reference Signal Received Quality (RSRQ) or Reference Signal Received Indicator (RSSI). The one or more types of degradation may e.g. be a radio degradation in DL only, a radio degradation in both DL and UL, interference in UL, a measurement exceeding a threshold that was normal recently or delta time ago, a non-radio degradation comprising any one out of a fire, an explosion, a car crash, a virus, or a gas.

Another reason is because the neighbor cells have a certain known type of radio degradation, e.g. uplink interference.

A further reason would be that the target neighbour cell may experience certain types of radio degradation already known in advance by the network. Hence the network may then not prefer to trigger a handover of the UE 121 to that neighbour cell as the handover procedure may fail.

This action relates to actions 2 that will be described below.

Action 205

In order to restrain the influence from the network degradation, the second UE 122 needs to know what action to perform.

Therefore, the base station 110 sends to the second UE 122, the first decision to perform an action to restrain degrading influence from the location X.

As mentioned above, the second UE 122 may comprise one or more second UEs 122. Therefore, the first decision may be sent to each respective second UE 122 with the location L1 that is at a distance from the location X that is below the second threshold.

This action relates to action 2 that will be described below.

Action 206

As mentioned above, the action to restrain influence from the network degradation may in some embodiments comprise a first method controlled by the base station 110 or a neighbour base station.

In these embodiments the base station 110, upon a request, receives a report from the second UE 122. The report comprises current radio measurements of a first cell, cell1, in which the second UE 122 is served. The report further comprises current radio measurements of neighbour cells, cellsn, being neighbour to the second UE 122.

The measurement report may comprise measurements related to e.g. RSRP, RSRQ or RSSI. The measurement report may further comprise non-radio related measurements, related to e.g. a non-radio degradation comprising any one out of a fire, an explosion, a car crash, a virus, a gas, radio degradation e.g. RSRP, RSRQ, RSSI etc., or to non-radio degradation, e.g. indicators type of gas, gas1, or temperature etc., exceeding a predefined threshold.

The received measurement reports may indicate that there are no neighbour cells suitable to force hand over the second UE 122 to.

In some embodiments the base station 110 decides a fourth decision. The fourth decision comprises performing the second method instead of the first method. The fourth decision is based on any one or more of the received measurement report or the congestion level of the neighbour cells, and on the status of the neighbour cell, congested, degraded etc.

This action relates to action 10 that will be described below.

Action 207

In order to restrain the influence from the network degradation the second UE 122 may in some embodiments be handed over to a second cell.

In these embodiments the base station 110 sends a second decision to the second UE 122. The second decision is to force hand over to a second cell, cell2, comprised in the cellsn. The second decision is based on the report of the current radio measurements of cell1 and the neighbour cells.

This action relates to action 11 that will be described below.

Action 208

Once moved away from the network degradation, the second UE 122 may in some embodiments return to cell1 or any other suitable cell.

In these embodiments the a base station 110 is serving cell2. The first method further comprises that the base station 110 decides a third decision when the second UE 122 is at a second location, location L2, with a distance from the location X, that is above a second threshold. The third decision is to force hand over from cell2 to any one out of cell1 or any of the cellsn.

Which cell the second UE 122 is handed over to may depend on which cell that will be the most suitable cell. Deciding the most suitable cell may e.g. depend on on any one or more out of the signal quality the second UE 122 receives from one or more cells, cellsn, being neighbour to the second UE, the level of congestion of the one or more cells, or whether or not the one or more cells may suffer from one or more types of degradation. The signal quality may depend on e.g. RSRP, RSRQ or RSSI. The one or more types of degradation may e.g. be a radio degradation in DL only, a radio degradation in both DL and UL, interference in UL, a measurement exceeding a threshold that was normal recently or delta time ago, a non-radio degradation comprising any one out of a fire, an explosion, a car crash, a virus, or a gas.

This action relates to action 12 that will be described below.

Action 209 In some embodiments the base station 110 sends the third decision to force hand over to the second UE 122.

This action relates to action 12 that will be described below.

Action 210

As mentioned above, the action to restrain influence from the network degradation may in some embodiments comprise a second method controlled by the second UE 122.

In these embodiments the base station 110 may send an instruction to the second UE 122 when the second UE 122 is approaching location X. The instruction instructs the second UE 122 to take a precaution action to restrain degrading influence from the location X.

Depending on the type of network degradation and whether or not the second UE 122 has already entered area comprising the network degradation, different precaution actions may be taken.

The precaution action may e.g. comprise any one or more out of: Postpone sending data until leaving the location X, stop receiving data from the network until leaving the location X, or avoiding to pass by location X in case the network degradation is a non-radio degradation.

This action relates to action 20 that will be described below.

Example embodiments of a method performed by the first UE 121 for assisting the base station 110 in handling network degradation in the wireless communications network 100, will now be described with reference to a flowchart depicted in FIG. 3. In an example scenario a first UE 121 experiences a network degradation as can be seen from FIG. 1b described above. The network degradation may result in an increased rate of loss of connections, dropped data rates and lost data packages if no precautionary actions is taken. The first UE 121 is served by the base station 110. The method comprises the following actions, which actions may be taken in any suitable order.

Action 301

Depending on the type of network degradation different actions to restrain the influence of the network degradation may be decided later on by the base station 110.

In some embodiments, when experiencing a network degradation, the first UE 121 determines that the type of the network degradation is any one out of a radio degradation in DL only, a radio degradation in both DL and UL, interference in UL, a measurement exceeding a threshold that was normal recently or delta time ago, or a non-radio degradation comprising any one out of a fire, an explosion, a car crash, a virus, or a gas.

This action relates to action IS1 that will be described below.

Action 302

By informing the base station 110 of the network degradation, the first UE 121 assists the base station 110 in restraining the influence of the degradation.

When experiencing a network degradation, the first UE 121 sends a determined type of the network degradation together with an estimated first Timing Advance, TA1, value, to the base station 110. The TA1 value will enable the base station 110 to identify one or more second UEs 122 that are close to the degraded location, location X, associated with the network degradation. The determined type of network degradation will enable the base station 110 to make a first decision to perform an action to restrain degrading influence from the location X. The action is to be performed by the identified second UEs 122.

This action relates to action IS1 that will be described below.

Example embodiments of method performed by a second User Equipment, UE, (122) for handling network degradation in the wireless communications network 100, will now be described with reference to a flowchart depicted in FIG. 4.

In an example scenario a second UE 122 approaches a network degradation as can be seen from FIG. 1b described above. The network degradation may result in an increased rate of loss of connections, dropped data rates and lost data packages if no precautionary actions is taken. The second UE 122 is served by the base station 110. The method comprises the following actions, which actions may be taken in any suitable order.

Action 401

The base station 110 compares the location of the second UE 122 with the location of the network degradation to determine if the second UE 122 is approaching the degraded area.

When a first location, location L1, of the second UE 122 is at a distance from a degraded location, location X, associated with the network degradation, that is below a second threshold, the second UE 122 receives a first decision from the base station 110. The first decision is to perform an action to restrain degrading influence from the location X. The first decision is based on a determined type of the network degradation.

In some embodiments the action to be performed to restrain degrading influence from the location X, comprises any one out of a first method controlled by the base station 110 or a neighbour base station, or a second method controlled by the second UE 122.

This action relates to action 2 that will be described below.

Action 402

As mentioned above, the action to restrain influence from the network degradation may in some embodiments comprise a first method controlled by the base station 110 or a neighbour base station.

In these embodiments, upon a request from the base station 110, the second UE 122 may send a report to the base station 110. The report comprises current radio measurements of a first cell, cell1, in which the second UE 122 is served. The report further comprises current radio measurements of neighbour cells, cellsn, being neighbour to the second UE 122.

The measurement report may comprise measurements related to e.g. RSRP, RSRQ or RSSI. The measurement report may further comprise non-radio related measurements, related to e.g. a non-radio degradation comprising any one out of a fire, an explosion, a car crash, a virus, or a gas, radio degradation e.g. RSRQ, RSSI, etc., or to non-radio degradation indicators (e.g. type of gas, gas1, or temperature etc. . . . exceeding a predefined threshold.

This action relates to action 10 that will be described below.

Action 403

In some embodiments the second UE 122 receives a second decision from the base station 110. The second decision is to force hand over to a second cell, cell2, comprised in the cellsn. The second decision is based on the report of the current radio measurements of cell1 and the neighbour cells.

This action relates to action 11 that will be described below.

Action 404

Once moved away from the network degradation, the second UE 122 may in some embodiments return to cell1 or any other suitable cell.

In these embodiments, when the second UE 122 is at a second location, location L2, in the cell2, with a distance from the location X, that is above a second threshold, the second UE 122 may receive a third decision from a base station serving cell2. The third decision is to force hand over from cell2 to any one out of cell1 or any of the cellsn.

As mentioned above, which cell the second UE 122 is handed over to may depend on which cell is the most suitable cell. Deciding the most suitable cell may e.g. depend on on any one or more out of the signal quality the second UE 122 receives from one or more cells, cellsn, being neighbour to the second UE, the level of congestion of the one or more cells, or whether or not the one or more cells may suffer from one or more types of degradation. The signal quality may depend on e.g. RSRP, RSRQ or RSSI. The one or more types of degradation may e.g. be a radio degradation in DL only, a radio degradation in both DL and UL, interference in UL, a measurement exceeding a threshold that was normal recently or delta time ago, a non-radio degradation comprising any one out of a fire, an explosion, a car crash, a virus, a gas, or because these neighbor cells have a certain known type of radio degradation, e.g. uplink interference The signal quality may depend on e.g. RSRP, RSRQ, or RSSI.

This action relates to action 12 that will be described below.

Action 405

As mentioned above, the action to restrain influence from the network degradation may in some embodiments comprise a second method controlled by the second UE 122.

In these embodiments, when triggered by an event, the second UE 122 may take a precaution action to restrain degrading influence from the location X. The event comprises any one out of when starting to experience network degradation, or when receiving information from the base station 110 that the second UE 122 is approaching location X.

Depending on the type of network degradation and whether or not the second UE 122 has already entered area comprising the network degradation, different precaution actions may be taken.

The precaution action may e.g. comprises any one or more out of: Postpone sending data until leaving the location X, stop receiving data from the network until leaving the location X or avoiding to pass by location X in case the network degradation is a non-radio degradation.

This action relates to action 20 that will be described below.

Embodiments mentioned above will now be further described and exemplified. The text below is applicable to and may be combined with any suitable embodiment described above.

Figure 5A:
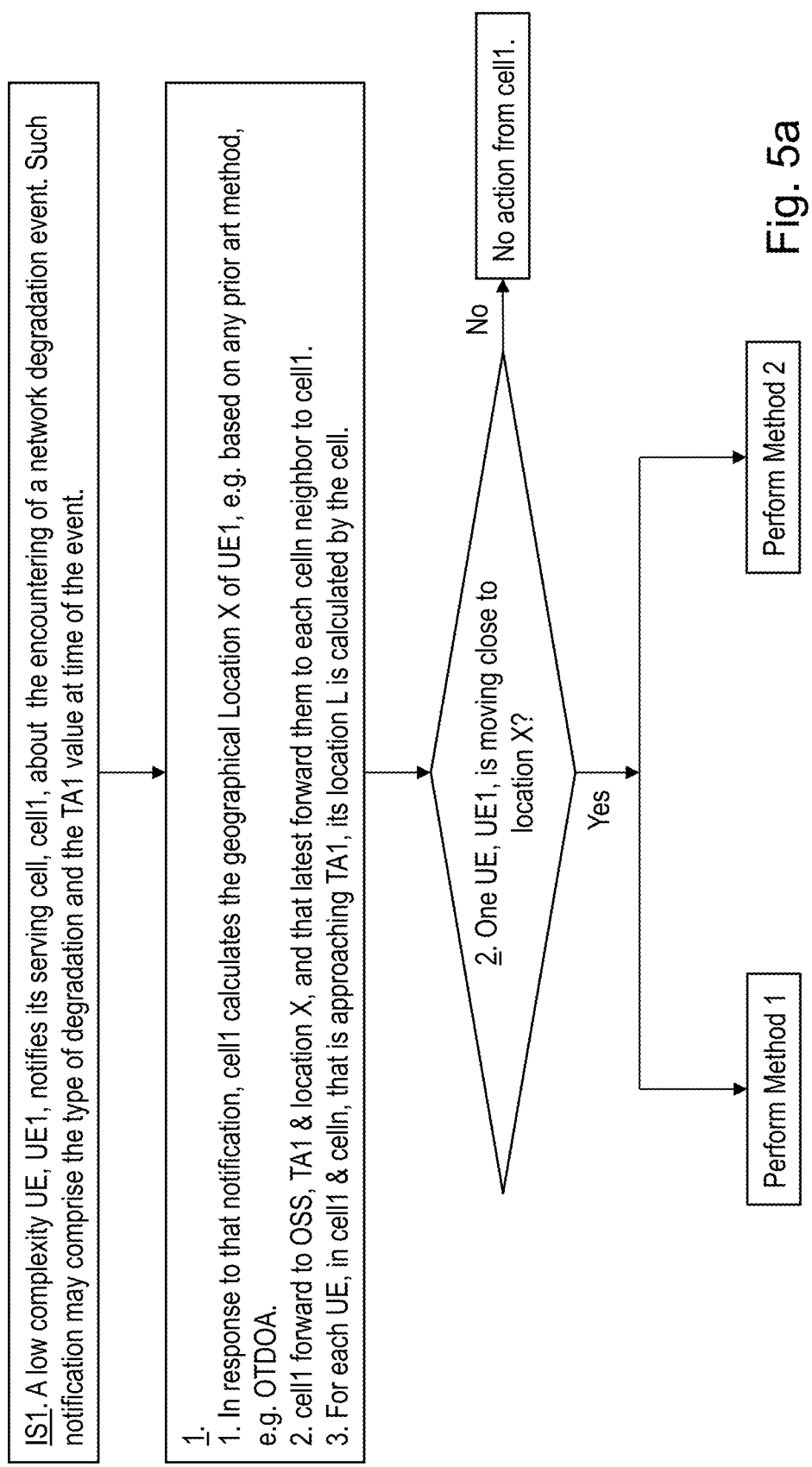
FIGS. 5 *a, b, c* and *d* are flowcharts depicting embodiments of a method.
Figure 5D:
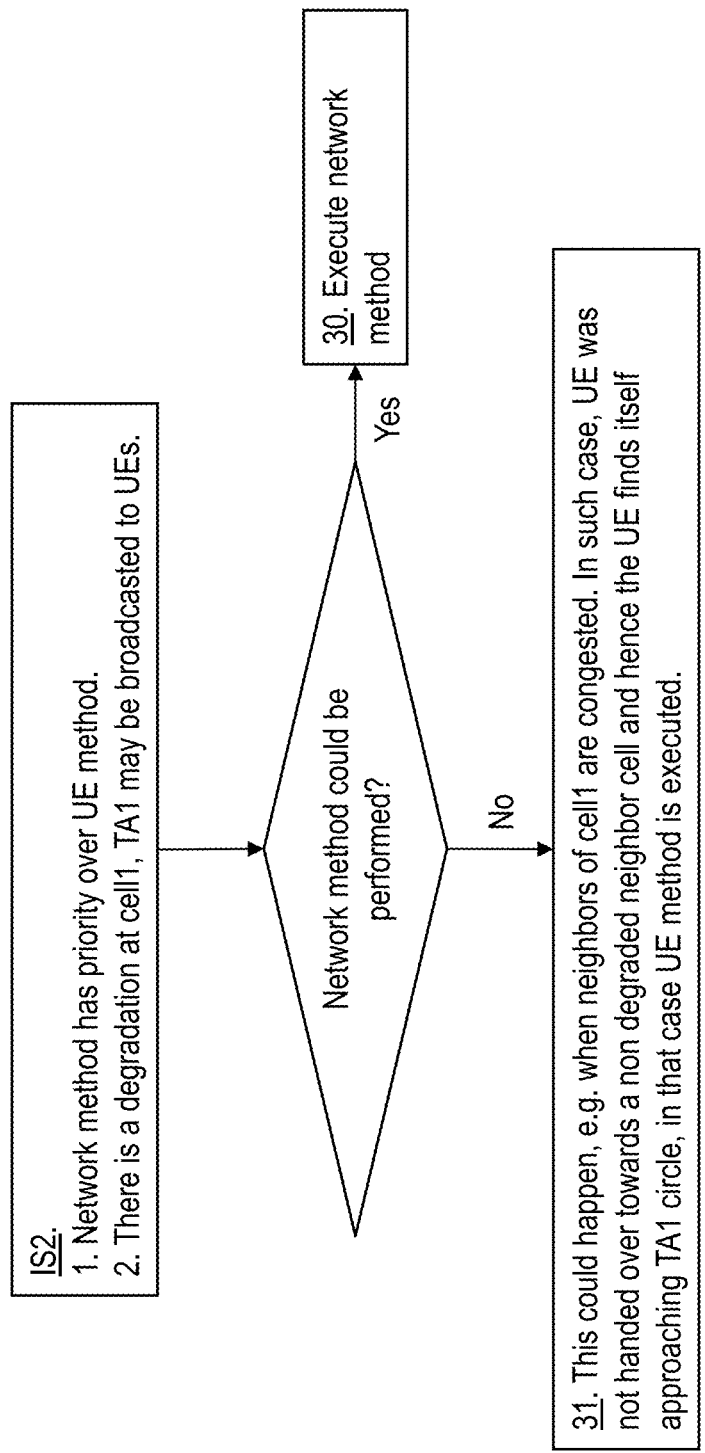

Actions IS1 and 1-2 of FIG. 5a, Actions 10-11 of FIG. 5b, Action 20 of FIG. 5c and Actions IS2 and 30-31 of FIG. 5d depict examples of detailed actions according to embodiments herein. In the FIGS. 6a-d the base station 110 is referred to as network, network node or network side, the first UE 121 and second UE 122 is respectively referred to as UE1 and UE2, and first method and second method is respectively referred to as Method 1 and Method 2.

The actions may be taken in any suitable order. Some actions are new according to embodiments herein and are marked so, and some steps are performed according prior art.

In the below example three embodiments of methods are described. A first method, Method 1, comprise actions performed at the network side, such as e.g. by the base station 110, to restrain the influence of the network degradation on UEs, such as e.g. the second UE 122. A second method, Method 2, comprise actions performed by a UE, such as e.g. the second UE 122, to restrain the influence of the network degradation. A third method, Method 3, comprise factors on which the network, such as e.g. the base station 110, selects the first or second method.

Action IS1

A low complexity UE, such as UE1, located in the cell1 encounters a network degradation. The network degradation may be either radio or non-radio degradation. UE1 sends a timing advance value TA1 to the network such as the base station 110, at time of encountering the degradation. The method of reporting varies depending on if UE1 is in connected or idle mode.

If UE1 is in connected mode, it may store the TA1 value calculated at the time when UE1 has first encountered the network degradation and the type of network degradation. UE1 then sends the TA1 value and the type of the degradation to the network node such as the base station 110, serving cell1. This should preferably be done as soon as possible as follows:

If the degradation is not a loss of radio coverage, UE1 sends the TA1 value and the type of the degradation immediately at the encounter of the degradation.

If the degradation is a loss of radio coverage, UE1 sends the TA1 value and the type of the degradation immediately after exiting the degraded area.

If UE1 is in idle mode when encountering the network degradation, e.g. very poor RSRP, UE1 immediately triggers a forced Tracking Area Update (TAU) procedure in which it sends in a dedicated signaling message, e.g. Radio Resource Control (RRC) Measurement Report, to the network node, such as the base station 110, serving cell1. The message comprises the type of network degradation and the TA1 value estimated at the time of sending the RRC message. This action is related to action 201, 301 and 302 described above.

Action 1

The network calculates the geographical location, location X, of the degradation based on the received TA1 value via any prior art method such as e.g. OTDOA or any other suitable method. The network node serving cell1 may forward the TA1 value and location X to the Operating Support Center (OSS) that controls all cells in the network, and the OSS in turn may forward them to each cells, cellsn, neighbour to cell1. For every UE, including UE1, the network node serving cell1 may monitor the TA, e.g. TA2, value of that UE, e.g. UE2, and if the difference between TA2 and TA1 is below a first threshold, the network may estimate, via any prior art method, e.g. OTDOA, the geographical location L1 of UE2. This action is related to actions 202 and 203 described above.

Action 2

The network node compares the location L1 of UE2 and the location X of the network degradation. If the distance between location L1 and location X is above a second threshold, no further action is taken by the network. If the distance between location L1 and location X is below a second threshold, then any one of Method 1 or Method 2 is performed. This step is related to actions 204, 205 and 401 described above.

Actions 10-12 are related to Method 1 and will be described below.

Action 10

The network node serving cell1 may request UE2 to report radio measurements of its serving cell, cell 1, as well as of the neighbouring cells, cellsn, before reaching location X. The request may be sent from cell1 to UE2 via dedicated signaling, e.g. a rrcConnectionReconfiguration message. This action is related to actions 206 and 402 described above.

Action 11

The network node serving cell1 may decide, based on the received radio measurements, to force handover of UE2 towards any of the neighbouring cellsn, e.g. cell2. This action is related to actions 207 and 403 described above.

Action 12

UE2 may remain in e.g. cell2 until it moves away from the network degradation. A network node serving cell2 may then hand over UE2 towards cell1 or any other cell, e.g. cell3, among the cellsn at the time of exit from the network degradation. This action is related to actions 208, 209 and 404 described above.

Action 20 is related to Method 2 and will be described below. With timing advance UE2 is virtually located on a circle where location X is one point of that circle. However, the UE2 does not know the exact location X. As a result UE2 at location L1 of that circle but far away from location X may trigger precaution action of degradation even though it is far away from location X. In order to let avoid such confusion, any one out of two procedures may be performed by UE2.

Action 20

1st procedure: When UE2 is close to TA1 and start experiencing the degradation, trigger a precaution action, e.g. postpone sending data until it crosses the degraded area.

2nd procedure: The network indicates to UE2 that it is close to location X and to take any action. For every UE, e.g. UE2, that is approaching TA1, the network may estimate the exact location of UE2 via any prior art method, e.g. OTDOA. The network sends a notification to the UE2, e.g. in a dedicated signaling message. The notification may indicate to UE2 to take a precaution action, e.g. postpone sending data until it leaves the network degradation. This action is related to actions 210 and 405 described above.

Actions IS2 and 30-31 are related to Method 3 and will be described below.

Action IS2

Method 1 may have priority over Method 2, since with Method 1 the UE, e.g. UE2, is moved away from the degradation, by forced handover, without experiencing the degradation. With Method 2, UE2 will experience the degradation, even though for a short period. UE2 may have to e.g. suspend sending any data until it leaves the degradation. The TA, TA1, value, may have been broadcasted to all UEs in cell1.

Action 30

If UE2 is approaching location X and also receives good radio signal from any neighbour cell among cellsn of cell1, and if those neighbour cells are not congested, then the Method 1 is performed.

Action 31

There are situations where Method 1 is not suitable, e.g. all neighbour cells among cellsn of cell1 are already congested when UE2 approaches location X or UE2 is receiving poor radio signal quality from the only non-congested neighbour cell among cellsn, e.g. cell5, then Method 2 is performed.

Figure 6A:
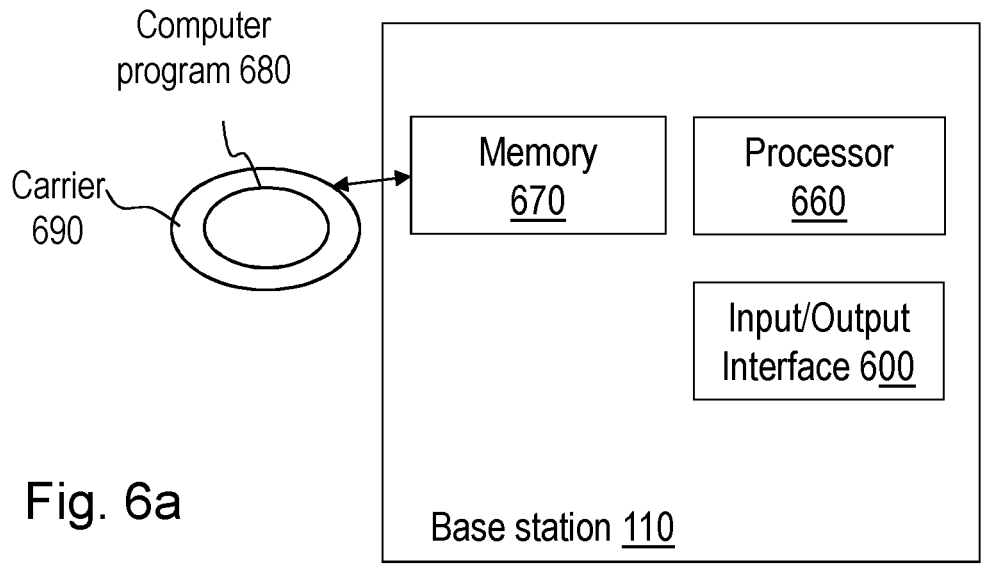
FIGS. 6 *a* and *b* are schematic block diagrams illustrating embodiments of a base station.
Figure 6B:
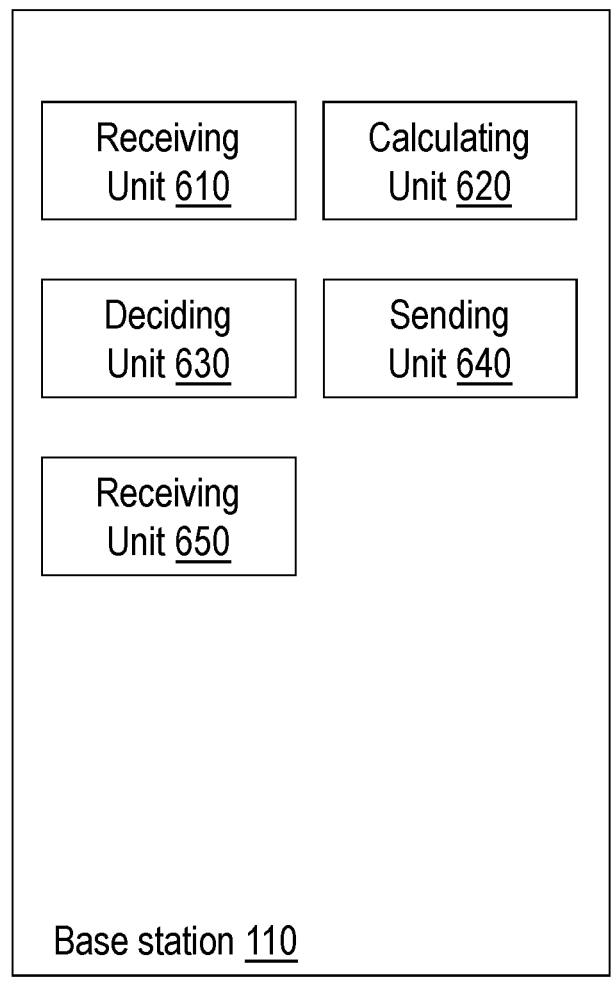

To perform the method actions, the base station 110 may comprise an arrangement depicted in FIGS. 6a and b. The base station 110 is configured to handle network degradation in a wireless communications network 100.

The base station 110 may comprise an input and output interface 600 configured to communicate with e.g. the first UE 121, the one or more second UEs 122 and with network nodes in the wireless communications network 100.

The base station 110 is further configured to, e.g. by means of a receiving unit 610 in the base station 110, receive from a first UE 121 experiencing a network degradation, a determined type of the network degradation together with an estimated first Timing Advance, TA1, value.

The determined type of the network degradation may be adapted to be any one out of a radio degradation in DL only, a radio degradation in both DL and UL, interference in UL, a measurement exceeding a threshold that was normal recently or delta time ago, or a non-radio degradation comprising any one out of a fire, an explosion, a car crash, a virus, or a gas.

The base station 110 is further configured to, e.g. by means of a calculating unit 620 in the base station 110, calculate a location, location X, associated with the network degradation. The calculation is based on the received TA1 value.

The second UE 122 may be adapted to comprise one or more second UEs 122.

The base station 110 may further be configured to, e.g. by means of the calculating unit 620 in the base station 110, when a second UE 122 out of the one or more second UEs 122 has a second TA, TA2, value with a difference to the TA1 value that is below a first threshold value, calculate a first location L1 of that second UE 122 based on its TA2 value.

The base station 110 is further configured to, e.g. by means of a deciding unit 630 in the base station 110, when a first location, location L1, of a second UE 122 is at a distance from the location X that is below a second threshold, decide a first decision to perform an action adapted to restrain degrading influence from the location X. The first decision is adapted to be based on the determined type of the network degradation.

The action to restrain degrading influence from the location X to be performed may be adapted to comprise any one out of a first method controlled by any one out or the base station 110, or a neighbour base station, and a second method controlled by the second UE 122.

The base station 110 may further be configured to, e.g. by means of the deciding unit 630 in the base station 110, decide the first decision to perform an action to restrain degrading influence from the location X, by being performed for each second UE 122 with a location L1 that is at a distance from the location X that is below the second threshold.

The base station 110 may be adapted to serve cell2.

The base station 110 may further be configured to, e.g. by means of the deciding unit 630 in the base station 110, when the second UE 122 is at a second location, location L2, with a distance from the location X, that is above a second threshold, decide a third decision. The third decision is adapted to force hand over from cell2 to any one out of cell1 or any of the cellsn.

The base station 110 is further configured to, e.g. by means of a sending unit 640 in the base station 110, send the first decision to perform an action adapted to restrain degrading influence from the location X. to the second UE 122.

The base station 110 may further be configured to, e.g. by means of the sending unit 640 in the base station 110, send the first decision to each respective second UE 122 with the location L1 that is at a distance from the location X that is below the second threshold.

The base station 110 may further be configured to, e.g. by means of the sending unit 640 in the base station 110, send a second decision to the second UE 122. The second decision is adapted to force hand over to a second cell, cell2, comprised in the cellsn. The second decision is based on the report of the current radio measurements of cell1 and the neighbour cells.

The base station 110 may further be configured to, e.g. by means of the sending unit 640 in the base station 110, send to the second UE 122, the third decision adapted to force hand over.

The base station 110 may further be configured to, e.g. by means of the sending unit 640 in the base station 110, when the second UE 122 is approaching location X, send an instruction to the second UE 122 to take a precaution action adapted to restrain degrading influence from the location X.

The precaution action may be adapted to comprise any one or more out of: Postpone sending data until leaving the location X, stop receiving data from the network until leaving the location X or avoiding to pass by location X in case the network degradation is a non-radio degradation.

The base station 110 may further be configured to, e.g. by means of the receiving unit 650 in the base station 110, upon a request, receive from the second UE 122 a report. The report is adapted to comprise current radio measurements of a first cell, cell1, in which the second UE 122 is served. The report is further adapted to comprise current radio measurements of neighbour cells, cellsn, being neighbour to the second UE 122.

Those skilled in the art will also appreciate that the units in the base station 110 mentioned above may refer to a combination of analogue and digital circuits, and/or one or more processors configured with software and/or firmware, e.g. stored in the base station 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 660 of a processing circuitry in the base station 110 depicted in FIG. 6*a*, together with respective computer program code for performing the functions and actions of the embodiments herein. The program code mentioned above may also be provided as a computer program product, for instance in the form of a data carrier carrying computer program code for performing the embodiments herein when being loaded into the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 670 comprising one or more memory units. The memory 670 comprises instructions executable by the processor 660 in the base station 110. The memory 670 is arranged to be used to store e.g. TA values, locations, measurement report, measurements, decisions and applications to perform the methods herein when being executed in the base station 110.

In some embodiments, a respective computer program 680 comprises instructions, which when executed by the respective at least one processor 660, cause the at least one processor 660 of the base station 110 to perform the actions above.

In some embodiments, a respective carrier 690 comprises the respective computer program 680, wherein the carrier is one of an electronic signal, an optical signal, an electromagnetic signal, a magnetic signal, an electric signal, a radio signal, a microwave signal, or a computer-readable storage medium.

Figure 7A:
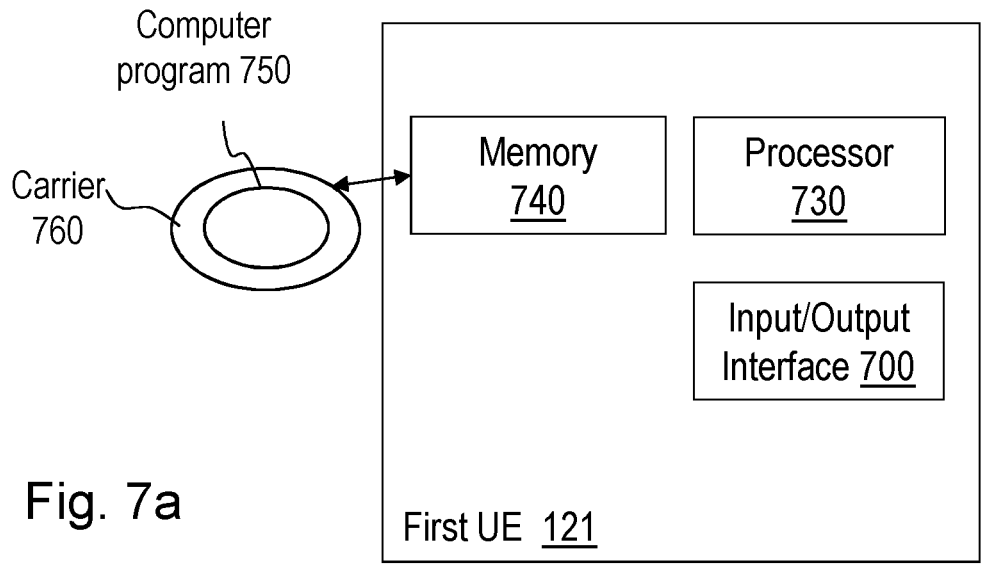
FIG. 7 *a* and *b* are schematic block diagrams illustrating embodiments of a first UE.
Figure 7B:
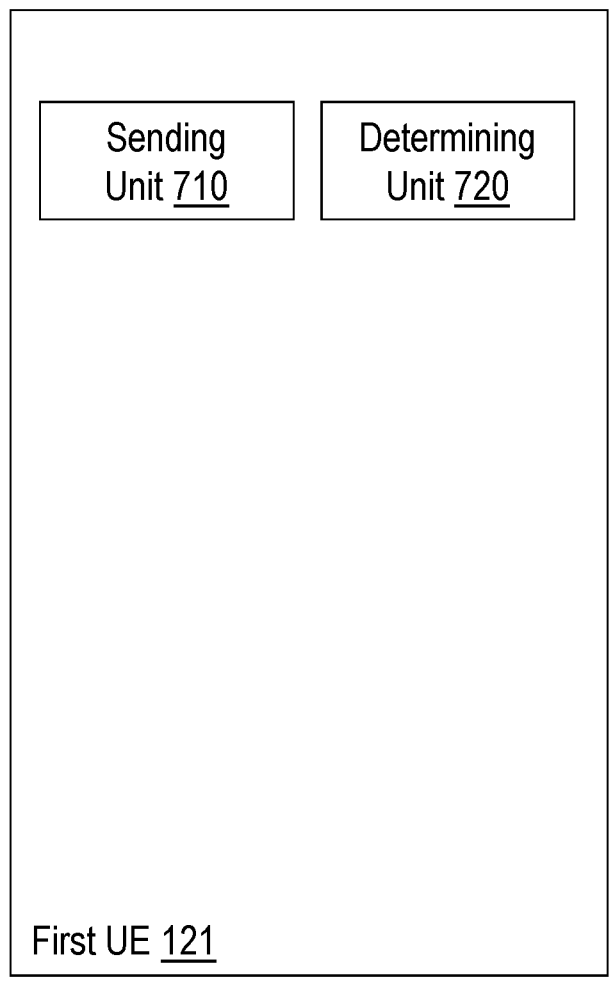

To perform the method actions, the first UE 121 may comprise an arrangement depicted in FIGS. 7*a* and *b*. The first UE 121 is configured to assist a base station 110 in handling network degradation in a wireless communications network 100.

The first UE 121 may comprise an input and output interface 700 configured to communicate with the with network nodes, such as e.g. the base station 110, in the wireless communications network 100.

The first UE 121 is further configured to, e.g. by means of a sending unit 710 in the first UE 121, when experiencing a network degradation, send to the base station 110, a determined type of the network degradation together with an estimated first Timing Advance, TA1, value. The TA1 value is adapted to enable the base station 110 to identify one or more second UEs 122 that are close to a degraded location, location X, associated with the network degradation. The determined type of network degradation is adapted to enable the base station 110 to make a first decision to perform an action to restrain degrading influence from the location X. The action is to be performed by the identified second UEs 122.

In some embodiments, the first UE 121 is further configured to, e.g. by means of a determining unit 720 in the first UE 121, when experiencing a network degradation, determine that the type of the network degradation is any one out of a radio degradation in DL only, a radio degradation in both DL and UL, interference in UL, a measurement exceeding a threshold that was normal recently or delta time ago, or a non-radio degradation comprising any one out of a fire, an explosion, a car crash, a virus, or a gas.

Those skilled in the art will also appreciate that the units in the first UE 121 mentioned above may refer to a combination of analogue and digital circuits, and/or one or more processors configured with software and/or firmware, e.g. stored in the first UE 121 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 730 of a processing circuitry in the first UE 121 depicted in FIG. 7a, together with respective computer program code for performing the functions and actions of the embodiments herein. The program code mentioned above may also be provided as a computer program product, for instance in the form of a data carrier carrying computer program code for performing the embodiments herein when being loaded into the first UE 121. One such carrier may be in the form of a CD ROM disc. It is however feasible with other data carriers such as a memory stick. The computer program code may furthermore be provided as pure program code on a server and downloaded to the first UE 121.

The first UE 121 may further comprise a memory 740 comprising one or more memory units. The memory 740 comprises instructions executable by the processor 730 in the first UE 121. The memory 740 is arranged to be used to store e.g. TA values, measurement reports, measurements, decisions and applications to perform the methods herein when being executed in the gateway node 110.

In some embodiments, a respective computer program 750 comprises instructions, which when executed by the respective at least one processor 730, cause the at least one processor 730 of the first UE 121 to perform the actions above.

In some embodiments, a respective carrier 760 comprises the respective computer program 750, wherein the carrier is one of an electronic signal, an optical signal, an electromagnetic signal, a magnetic signal, an electric signal, a radio signal, a microwave signal, or a computer-readable storage medium.

Figure 8A:
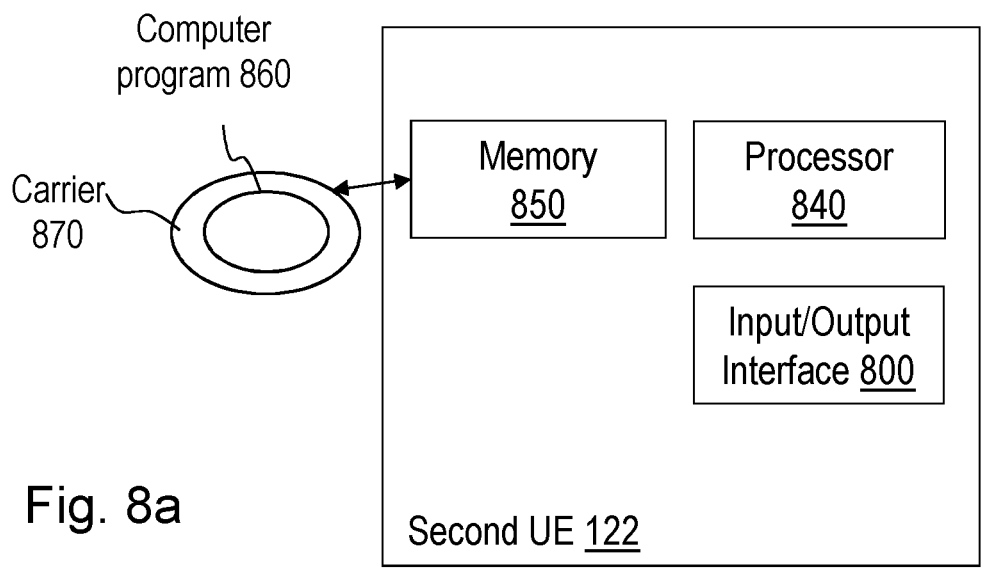
FIG. 8 *a* and *b* are schematic block diagrams illustrating embodiments of a second UE.
Figure 8B:
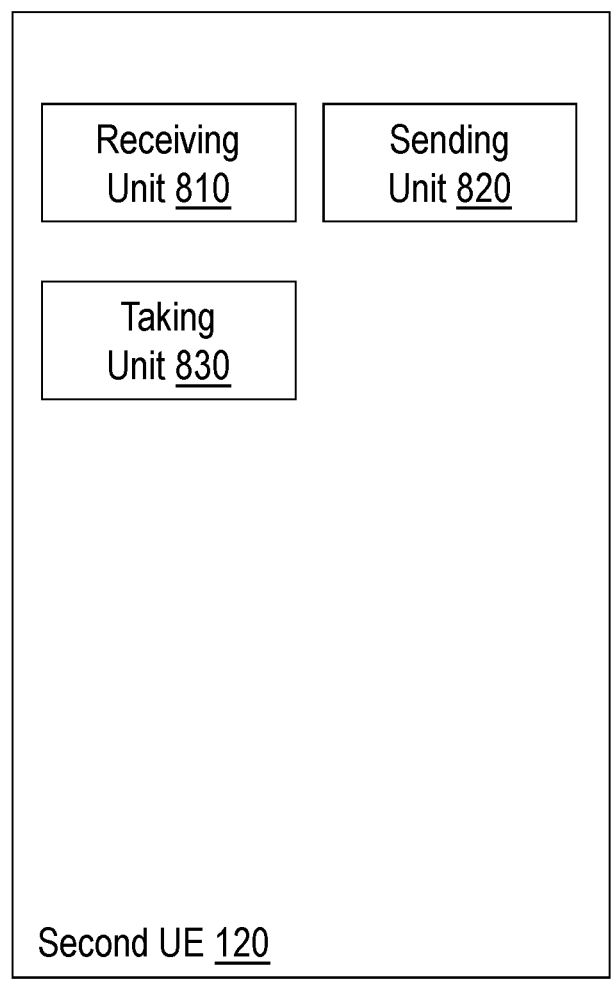

To perform the method actions, the second UE 122 may comprise the arrangement depicted in FIGS. 8a and b. The second UE 122 is configured to handle network degradation in a wireless communications network 100.

The second UE 122 may comprise an input and output interface 800 configured to communicate e.g. with network nodes, such as e.g. the base station 110, in the wireless communications network 100.

The second UE 122 is configured to, e.g. by means of a receiving unit 810 in the second UE 122, when a first location, location L1, of the second UE 122 is at a distance from a degraded location, location X, associated with the network degradation, that is below a second threshold, receive from a base station 110, a first decision to perform an action to restrain degrading influence from the location X. The first decision is adapted to be based on a determined type of the network degradation.

In some embodiments the action to be performed to restrain degrading influence from the location X, is adapted to comprise any one out of a first method controlled by the base station 110, or a neighbour base station, or a second method controlled by the second UE 122.

The second UE 122 may further be configured to, e.g. by means of the receiving unit 810 in the second UE 122, receive a second decision from the base station 110. The second decision is adapted to force hand over to a second cell, cell2, comprised in the cellsn. The second decision is adapted to be based on the report of the current radio measurements of cell1 and the neighbour cells.

The second UE 122 may further be configured to, e.g. by means of the receiving unit 810 in the second UE 122, when the second UE 122 is at a second location, location L2, in the cell2, with a distance from the location X, that is above a second threshold, receive a third decision from a base station serving cell2. The third decision is adapted to force hand over from cell2 to any one out of cell1 or any of the cellsn.

The second UE 122 may further be configured to, e.g. by means of a sending unit 820 in the second UE 122, send a report to the base station 110. The report is adapted to comprise current radio measurements of a first cell, cell1, in which the second UE 122 is served. The report further comprises current radio measurements neighbour cells, cellsn, being neighbour to the second UE 122.

The second UE may further be configured to, e.g. by means of a taking unit 830 in the second UE 122, take a precaution action adapted to restrain degrading influence from the location X. The event is adapted to comprise any one out of when starting to experience network degradation, or when receiving from the base station 110 information that the second UE 122 is approaching location X.

The precaution action may be adapted to comprise any one or more out of postpone sending data until leaving the location X, stop receiving data from the network until leaving the location X or avoiding to pass by location X in case the network degradation is a non-radio degradation.

Those skilled in the art will also appreciate that the units in the second UE 122 mentioned above may refer to a combination of analog and digital circuits, and/or one or more processors configured with software and/or firmware, e.g. stored in the second UE 122 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 840 of a processing circuitry in the second UE 122 depicted in FIG. 8a, together with respective computer program code for performing the functions and actions of the embodiments herein. The program code mentioned above may also be provided as a computer program product, for instance in the form of a data carrier carrying computer program code for performing the embodiments herein when being loaded into the second UE 122. One such carrier may be in the form of a CD ROM disc. It is however feasible with other data carriers such as a memory stick. The computer program code may furthermore be provided as pure program code on a server and downloaded to the second UE 122.

The second UE 122 may further comprise a memory 850 comprising one or more memory units. The memory 850 comprises instructions executable by the processor 840 in the second UE 122. The memory 850 is arranged to be used to store e.g. TA values, measurement report, measurements, decisions and applications to perform the methods herein when being executed in the second UE 122.

In some embodiments, a respective computer program 860 comprises instructions, which when executed by the respective at least one processor 840, cause the at least one processor 840 of second UE 122 to perform the actions above.

In some embodiments, a respective carrier 870 comprises the respective computer program 860, wherein the carrier is one of an electronic signal, an optical signal, an electromagnetic signal, a magnetic signal, an electric signal, a radio signal, a microwave signal, or a computer-readable storage medium.

FURTHER EXTENSIONS AND VARIATIONS

Figure 9:
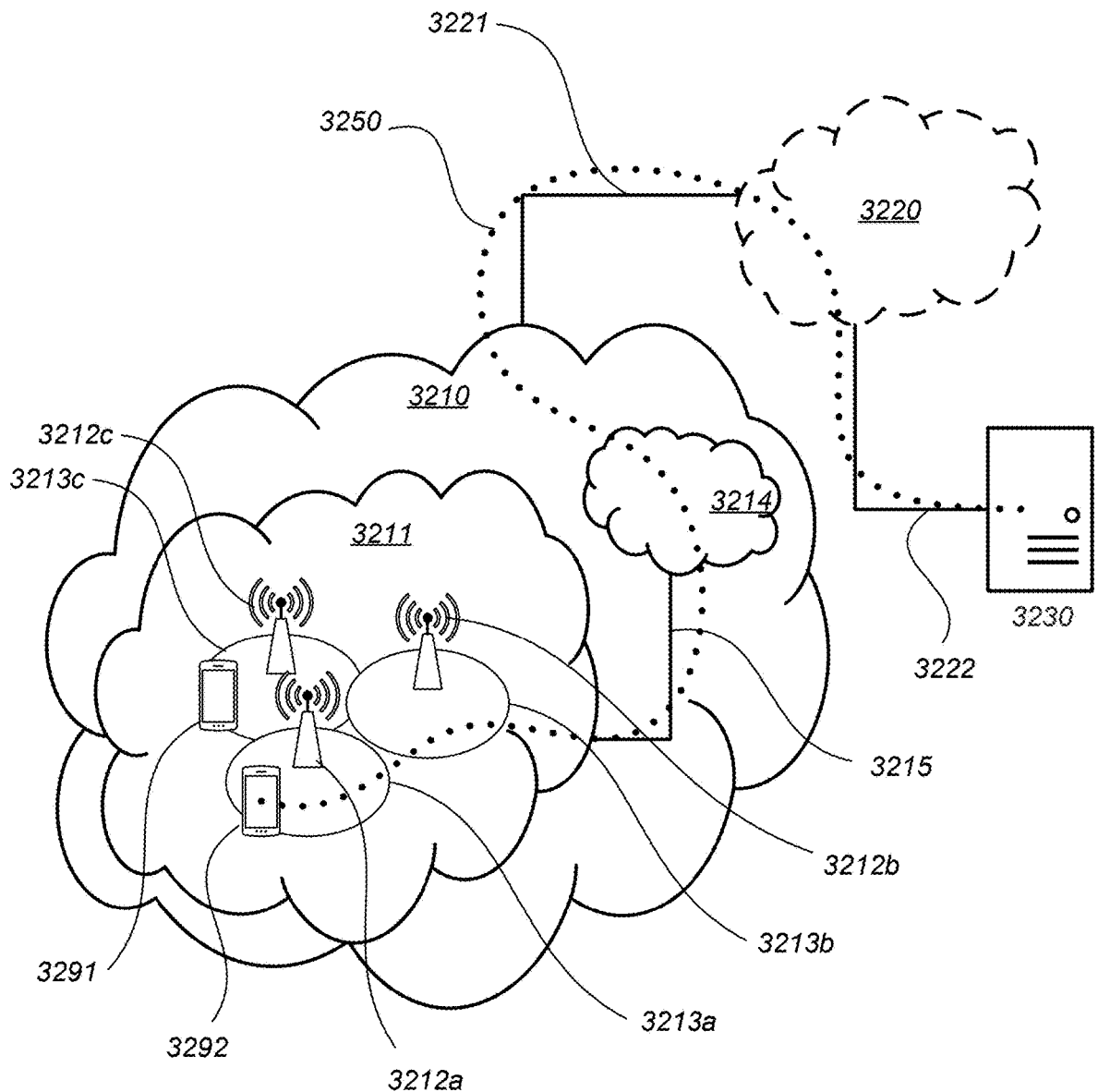
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the base station 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UEs 121 and 122 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

Figure 10:
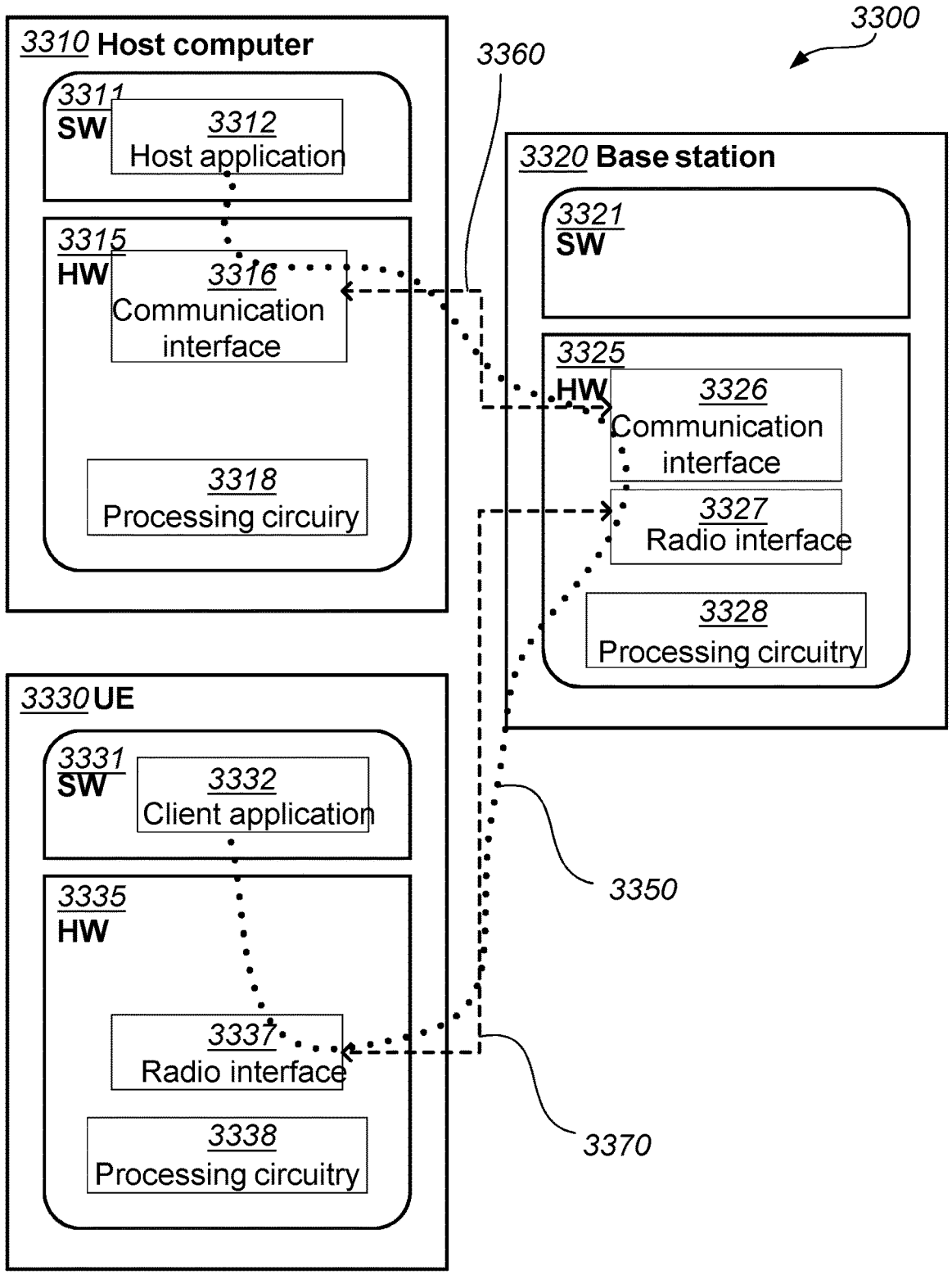
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
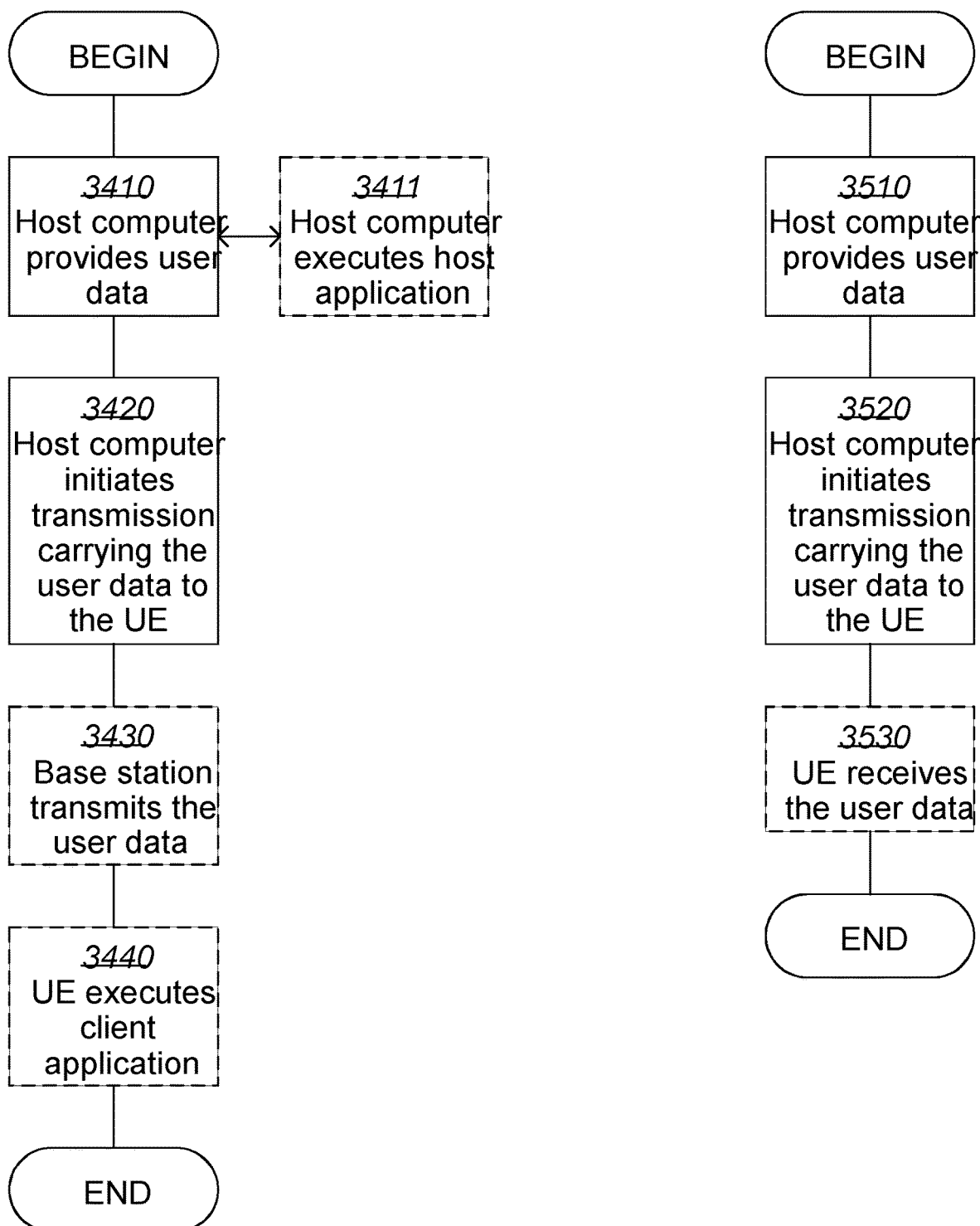
FIGS. 11 to 14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 13, 14:
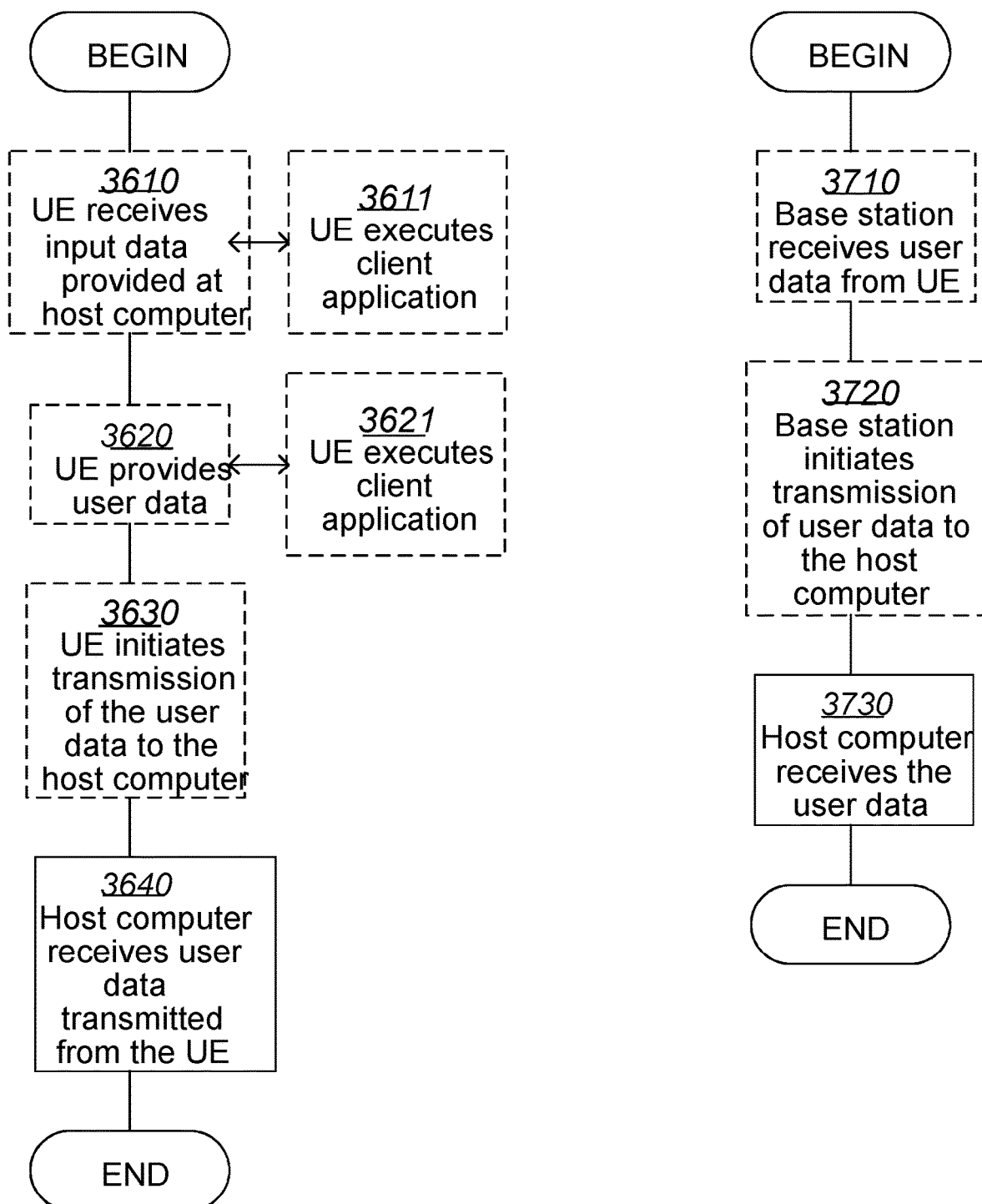

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used

The invention claimed is:

1. A method of handling network degradation in a wireless communications network, performed by a base station, the method comprising:
    receiving from a first user equipment (UE) experiencing a network degradation, a determined type of the network degradation together with an estimated first Timing Advance (TA) value;
    calculating, based on the first TA value, a location X associated with the network degradation;
    deciding, when a location L1 of a second UE is at a distance from the location X that is below a second threshold, a first decision to perform an action to restrain degrading influence from the location X, which first decision is based on the determined type of the network degradation; and
    sending to the second UE, the first decision to perform the action to restrain degrading influence from the location X.

2. The method of claim 1, further comprising:
    deciding the first decision to perform the action to restrain degrading influence from the location X for each of one or more further UEs at a distance from the location X that is below the second threshold; and
    sending the first decision to each respective further UE.

3. The method of claim 1, further comprising calculating the first location L1 of the second UE based on a second TA value of the second UE responsive to the second TA value having a difference from the first TA value that is below a first threshold value.

4. The method of claim 1, wherein the determined type of the network degradation is any one out of:
    a radio degradation in downlink only;
    a radio degradation in both downlink and uplink;
    uplink interference;
    a measurement exceeding a threshold that did not exceed the threshold previously; or
    a non-radio degradation comprising any one out of: a fire, an explosion, a car crash, a virus, or a gas.

5. The method of claim 1, wherein the action to restrain degrading influence from the location X comprises a process controlled by the base station, a neighbor base station, or the second UE.

6. The method of claim 5, wherein the process is controlled by the base station or the neighbor base station and comprises:
    upon a request, receiving from the second UE a report that comprises current radio measurements of a first cell (cell1) in which the second UE is served, and neighbor cells (cellsn) being neighbor to the second UE; and
    sending a second decision to the second UE, the second decision being to force handover to a second cell (cell2) comprised in the cellsn and the second decision being based on the report of the current radio measurements of cell1 and the neighbor cells.

7. The method of claim 6, wherein the base station serves cell2 and the method further comprises:
    deciding a third decision when the second UE is at a second location L2 with a distance from the location X that is above a second threshold, the third decision being to force handover from cell2 to any one out of cell1 or any of the cellsn; and
    sending, to the second UE, the third decision to force handover.

8. The method of claim 5, wherein the process is controlled by the second UE and the method further comprises sending an instruction to the second UE to take a precaution action to restrain degrading influence from the location X when the second UE is approaching location X.

9. The method of claim 8, wherein the precaution action comprises any one or more of:
    postpone sending data until leaving the location X;
    stop receiving data from the network until leaving the location X; or
    avoid passing by location X in case the network degradation is a non-radio degradation.

10. A base station, comprising:
    processing circuitry and memory comprising instructions executable by the processing circuitry whereby base station is configured to:
    receive from a first user equipment (UE) experiencing a network degradation, a determined type of the network degradation together with an estimated first Timing Advance (TA) value;
    calculate, based on the first TA value, a location X associated with the network degradation;

decide, when a first location L1 of a second UE is at a distance from the location X that is below a second threshold, a first decision to perform an action to restrain degrading influence from the location X, which first decision is based on the determined type of the network degradation; and send, to the second UE, the first decision to perform the action to restrain degrading influence from the location X.

11. The base station of claim 10, wherein the base station is further configured to:

decide the first decision to perform the action to restrain degrading influence from the location X for each of one or more further UEs at a distance from the location X that is below the second threshold; and send the first decision to each respective further UE.

12. The base station of claim 10, wherein the base station is further configured to calculate a first location L1 of the second UE based on a second TA value of the second UE responsive to the second TA value having a difference from the first TA value that is below a first threshold value.

13. The base station of claim 10, wherein the determined type of the network degradation is any one out of:

a radio degradation in downlink only;
a radio degradation in both downlink and uplink;
uplink interference;
a measurement exceeding a threshold that did not exceed the threshold previously; or
a non-radio degradation comprising any one out of: a fire, an explosion, a car crash, a virus, or a gas.

14. The base station of claim 10, wherein the action to restrain degrading influence from the location X comprises a process controlled by the base station, a neighbor base station, or the second UE.

15. The base station of claim 14, wherein the process is controlled by the base station or neighbor base station and comprises:

upon a request, receiving from the second UE a report, which report is adapted to comprise current radio measurements of a first cell (cell1) in which the second UE is served and neighbor cells (cellsn) being neighbor to the second UE; and send a second decision to the second UE, the second decision being to force handover to a second cell (cell2) comprised in the cellsn, the second decision being based on the report of the current radio measurements of cell1 and the neighbor cells.

16. The base station of claim 15, wherein the base station is further configured to:

serve cell2;
decide a third decision when the second UE is at a second location L2 with a distance from the location X that is above a second threshold, the third decision being to force handover from cell2 to any one out of cell1 or any of the cellsn; and
send, to the second UE, the third decision to force handover.

17. The base station of claim 14, wherein the process is controlled by the second UE and the base station is further configured to send an instruction to the second UE to take a precaution action adapted to restrain degrading influence from the location X when the second UE is approaching location X.

18. The base station of claim 17, wherein the precaution action comprises one or more of:

postpone sending data until leaving the location X;
stop receiving data from the network until leaving the location X; or
avoid passing by location X in case the network degradation is a non-radio degradation.

* * * * *